US011974962B2

(12) United States Patent
Joshi et al.

(10) Patent No.: US 11,974,962 B2
(45) **Date of Patent: *May 7, 2024**

(54) CHEST COMPRESSION SYSTEM AND METHOD

(71) Applicant: ZOLL Circulation, Inc., San Jose, CA (US)

(72) Inventors: Nikhil S. Joshi, San Jose, CA (US); Frederick J. Geheb, San Jose, CA (US); Lisa M. Campana, San Jose, CA (US)

(73) Assignee: ZOLL Circulation, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,788

(22) Filed: Jun. 24, 2022

(65) Prior Publication Data

US 2022/0387255 A1 Dec. 8, 2022

Related U.S. Application Data

(63) Continuation of application No. 16/661,927, filed on Oct. 23, 2019, now Pat. No. 11,400,014, which is a continuation of application No. 14/885,893, filed on Oct. 16, 2015, now Pat. No. 10,688,019.

(51) Int. Cl.
*A61H 31/00* (2006.01)
*A61H 11/00* (2006.01)

(52) U.S. Cl.
CPC ......... *A61H 31/007* (2013.01); *A61H 31/004* (2013.01); *A61H 31/008* (2013.01); *A61H 2011/005* (2013.01); *A61H 31/005* (2013.01); *A61H 2201/1604* (2013.01); *A61H 2201/1623* (2013.01); *A61H 2201/501* (2013.01); *A61H 2201/5061* (2013.01);
(Continued)

(58) Field of Classification Search
CPC ........ A61H 31/00–008; A61H 2031/001–003; A61H 2011/005; A61H 2201/5064; A61H 2201/5084
See application file for complete search history.

(56) References Cited

U.S. PATENT DOCUMENTS

| | | | | |
|---|---|---|---|---|
| 6,390,996 | B1 | 5/2002 | Halperin et al. | |
| 7,122,014 | B2 * | 10/2006 | Palazzolo | A61B 5/721 601/44 |
| 10,688,019 | B2 * | 6/2020 | Joshi | A61H 31/004 |

(Continued)

FOREIGN PATENT DOCUMENTS

| | | |
|---|---|---|
| EP | 2532340 | 12/2012 |
| EP | 3932382 | 1/2022 |

(Continued)

OTHER PUBLICATIONS

European Search Report from European Patent Application No. 16856352.6 dated Feb. 28, 2019. (submitted in related U.S. Appl. No. 16/661,927).

(Continued)

*Primary Examiner* — Valerie L Woodward
(74) *Attorney, Agent, or Firm* — Finch & Maloney PLLC

(57) ABSTRACT

A system and method for determining CPR induced chest compression depth using two sensors while accounting for different orientations of the two sensors.

20 Claims, 3 Drawing Sheets

(52) U.S. Cl.
CPC ................ *A61H 2201/5064* (2013.01); *A61H 2201/5084* (2013.01); *A61H 2230/06* (2013.01)

(56) References Cited

U.S. PATENT DOCUMENTS

| | | | | |
|---|---|---|---|---|
| 11,400,014 | B2 * | 8/2022 | Joshi | A61H 31/004 |
| 2010/0022904 | A1 * | 1/2010 | Centen | A61N 1/3925 600/595 |
| 2010/0228165 | A1 * | 9/2010 | Centen | A61N 1/0492 601/41 |
| 2012/0083720 | A1 | 4/2012 | Centen et al. | |
| 2012/0089054 | A1 | 4/2012 | Centen et al. | |
| 2013/0324894 | A1 | 12/2013 | Herken et al. | |
| 2015/0120201 | A1 * | 4/2015 | Silver | A61B 5/1107 702/19 |
| 2015/0257971 | A1 | 9/2015 | Chapman et al. | |
| 2017/0105899 | A1 | 4/2017 | Joshi et al. | |
| 2020/0206075 | A1 | 7/2020 | Joshi et al. | |

FOREIGN PATENT DOCUMENTS

| | | |
|---|---|---|
| KR | 20120062951 | 6/2012 |
| WO | WO2010099628 | 9/2010 |
| WO | WO2014078385 | 5/2014 |
| WO | WO2017066687 | 4/2017 |

OTHER PUBLICATIONS

Aase, et al., Compression Depth Estimation for CPR Quality Assessment Using DSP on Accelerometer Signals, 49 IEEE Transactions on Biomedical Engineering 263 (IEEE 2002) (submitted in related U.S. Appl. No. 16/661,927).

International Search Report and Written Opinion for International Application No. PCT/US2016/057200 dated Feb. 1, 2017. (submitted in related U.S. Appl. No. 16/661,927).

International Preliminary Report on Patentability issued in International Application No. PCT/US2016/057200 dated Apr. 17, 2018. (submitted in related U.S. Appl. No. 16/661,927).

Non-Final Office Action issued in U.S. Appl. No. 14/885,893 dated Jan. 23, 2019. (submitted in related U.S. Appl. No. 16/661,927).

Notice of Allowance issued in U.S. Appl. No. 14/885,393 dated Jul. 25, 2019. (submitted in related U.S. Appl. No. 16/661,927).

European Search Report for EP Application No. 21193611.7 dated Nov. 9, 2021. (submitted in related U.S. Appl. No. 16/661,927).

Aase, Sven O. et al., "Compression Depth Estimation for CPR Quality Assessment Using DSP on Accelerometer Signals", IEEE Transactions On Biomedical Engineering, vol. 49, No. 3, Mar. 3, 2002, pp. 263-268. (submitted in related U.S. Appl. No. 16/661,927).

Non-Final Office Action issued in U.S. Appl. No. 16/661,927 dated Nov. 24, 2021.

Notice of Allowance issued in U.S. Appl. No. 16/661,927 dated Mar. 31, 2022.

* cited by examiner

Step 1: obtain acceleration signal corresponding to acceleration vectors

Step 2: rotate belt vectors into housing coordinate frame

Step 3: combine rotated vectors with reference vectors

Step 4: double integrate acceleration to obtain depth of compression

CHEST COMPRESSION SYSTEM AND METHOD

RELATED APPLICATIONS

The present application is a continuation application of U.S. application Ser. No. 16/661,927 filed Oct. 23, 2019, which is a continuation of U.S. application Ser. No. 14/885,893 filed Oct. 16, 2015 (now U.S. Pat. No. 10,688,019). All above identified applications are hereby incorporated by reference in their entireties.

FIELD OF THE INVENTIONS

The inventions described below relate to the field of CPR.

BACKGROUND OF THE INVENTIONS

Halperin, et al., CPR Chest Compression Monitor, U.S. Pat. No. 6,390,996 (May 21, 2002) discloses a CPR chest compression monitor which uses a compression sensor, e.g. an accelerometer, to measure acceleration of a patient's chest wall due to CPR compressions to calculates the depth of compressions based on acceleration signals provided by the accelerometer.

Palazzolo, et al., Method of Determining Depth of Chest Compressions During CPR, U.S. Pat. No. 7,122,014 (Oct. 17, 2006) discloses the use of a chest compression monitor with a chest compression device, such as the AutoPulse® chest compression device, with an accelerometer in the belt, and an accelerometer fixed to the supporting surface is used as a reference sensor.

Halperin disclosed a compression monitor, e.g. comprising an accelerometer and a control system for processing accelerometer signals to determine the depth of chest compressions accomplished in the performance of CPR. In the systems proposed by Palazzolo, this system is improved with the addition of a reference sensor, which can be a second compression monitor or accelerometer. Systems that use a compression sensor with or without a reference sensor can be further improved to provide accurate measurement of chest compression depth.

SUMMARY

The devices and methods described below provide for improved chest compression depth determination in a compression monitor system comprising two motion sensors, with one motion sensor for detecting anterior chest wall movement due to compressions and a second sensor for detecting overall movement of the patient's thorax. The motion sensors provide motion signals, and may comprise three-axis accelerometer assemblies such as those used in current chest compression monitors. Each of these accelerometer assemblies provides motions signals comprising acceleration signals, on three axes. During the course of CPR compressions, acceleration signals from the first accelerometer assembly correspond to the movement of the anterior chest wall and acceleration signals from the second accelerometer assembly correspond to overall movement of the patient's thorax.

Assuming that the x, y and z axes of the accelerometers are parallel (not necessarily aligned, just parallel), a depth calculation is accurate and provides a basis for useful feedback to a CPR provider or CPR chest compression device. If the x, y and z axes of the accelerometers are not parallel, and are substantially non-parallel, the depth calculation may not be as accurate as desired. To improve the accuracy of the system, the control system described below is programmed to determine the relative orientation of the first and second accelerometer assemblies, and then rotate or project one or more the x, y and z movement vectors as determined from the first accelerometer assembly into the x, y and z frame of the second accelerometer assembly, and thereafter combining the rotated vectors of the first accelerometer with the vectors of the second accelerometer to determine the chest compression depth achieved by CPR compressions. (As an initial step, the relative orientation of the accelerometers is determined by sensing the acceleration of gravity, as sensed by both accelerometers, to establish a rotation matrix to be applied to the measured movement vectors before combination.)

The first and/or second compression sensors can be an accelerometer assembly alone, or a compression monitor puck, housed or un-housed, affixed or embedded in the compression belt of a belt-driven chest compression device or the piston of a piston-driven chest compression device, a compression monitor puck affixed or embedded in an ECG electrode assembly, or a free standing depth compression monitor (such as ZOLL Medical's Pocket CPR® chest compression monitor).

We use the terms movement vectors and motion signals to include acceleration signals corresponding to at least one of the x, y and z axes of the accelerometer assembly, calculated x, y and z velocity vectors determined by integrating the acceleration signal, and distance vectors determined by double integrating the acceleration signal.

DETAILED DESCRIPTION

Figure 1:
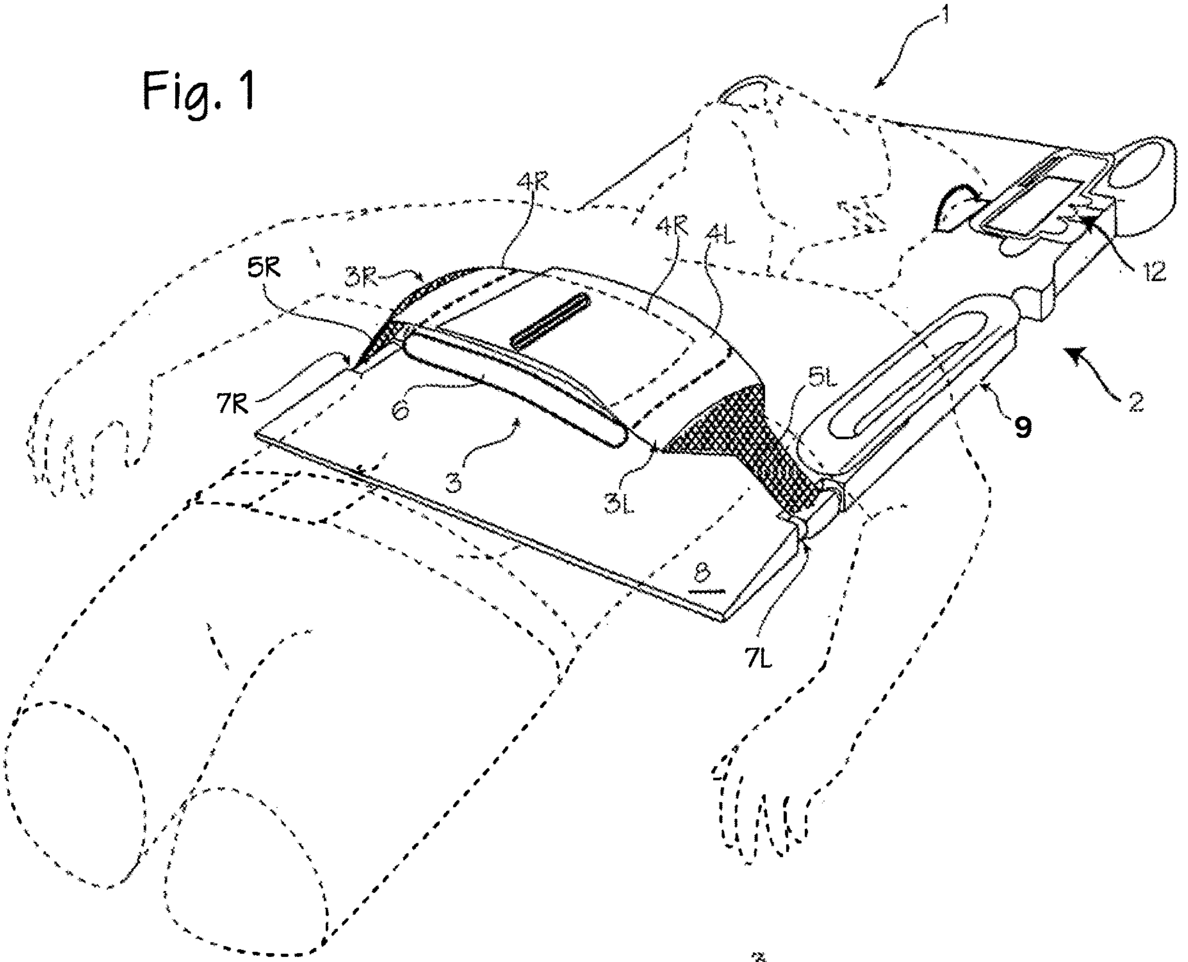
FIG. 1 shows a chest compression device fitted on a patient.
Figure 2:
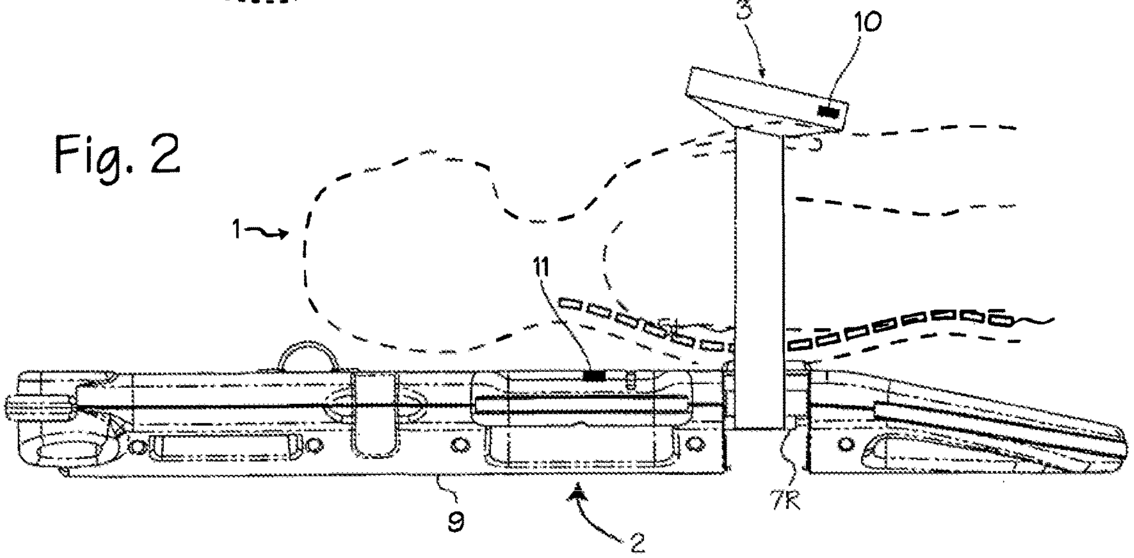
FIG. 2 is a side view of the compression device of FIG. 1.

Though the compression monitor system described in this application can be used to provide feedback for manual CPR and automated CPR using a variety of different chest compression devices, it is described here in the context of providing feedback for a belt driven chest compression device. FIGS. 1 and 2 illustrate a belt-driven chest compression system fitted on a patient 1. The belt-driven chest compression device 2 applies compressions with the belt 3 (which may comprise right belt portion 3R and a left belt portion 3L) and load distributing portion 4 (which may comprise a single piece belt, or may comprise right and left load distributing portions 4R and 4L) designed for placement over the anterior surface of the patient's chest while in use, and tensioning portions which extend from the load distributing portions to a drive spool, shown in the illustration as narrow pull straps 5R and 5L. A bladder 6 may be disposed between the belt and the chest of the patient. The narrow pull straps 5R and 5L of the belt are spooled onto a drive spool or spools located within the platform to tighten the belt during use. Laterally located drive spools 7L and 7R may be used, or laterally located spindles and a centrally located drive spool may be used. The chest compression device 2 includes a platform 8 which includes a housing 9 upon which the patient rests. A motor, drive spool, batteries, and other components of the system may be disposed within the housing. The motor is operable to tighten the belt about the patient at a resuscitative rate and depth. (A resuscitative rate may be any rate of compressions considered effective to induce blood flow in a cardiac arrest victim, typically 60 to 120 compressions per minute (the CPR Guidelines 2015 recommends 100 to 120 compressions per minute), and a resuscitative depth may be any depth considered effective to induce blood flow, and is typically 1.5 to 2.5 inches (the CPR Guidelines 2015 recommends a depth of at least two inches per compression).)

As shown in FIG. 2, the device includes a first motion sensor in the form of an accelerometer assembly 10 secured to the compression belt, near the center of the load distribution section, such that it overlies the patient's sternum when the device if fitted on a patient. This accelerometer assembly may be a compression monitor, including a housing and accelerometer, as disclosed in Halperin, or it may be an un-housed accelerometer assembly affixed to or embedded in the belt. A second motion sensor in the form of an accelerometer assembly 11 is secured to the housing, at any convenient point, inside the housing or on the surface of the housing. It may also be affixed directly to the patient's back, but it is more convenient to integrate it into the device. Both accelerometer assemblies are operably connected to a control system, indicated generally as item 12 (in FIG. 1), which may be disposed within the housing, or located in a separate system such as an Automated External Defibrillator control system. The AutoPulse® chest compression device can operate to perform compression in repeated compression cycles comprising a compression stroke, a high compression hold, a release period, and an inter-compression hold. Methods of operating a mechanical chest compression device such the AutoPulse® chest compression device or other chest compression device to accomplish compressions in cycles of compression, hold, and release are described our previous patents, for example, Sherman, et al., Modular CPR assist device to hold at a threshold of tightness, U.S. Pat. No. 7,374,548 (May 20, 2008). The inter-compression hold and high compression hold provide brief periods during which the accelerometer assemblies are not moving relative to each other. The depth compression determination provided by the control system, using the acceleration signals provided by the accelerometer assemblies, can be used as feedback control, to ensure that the chest compression device is compressing the chest to a desired predetermined depth. (Currently, a compression depth of at least two inches is recommended by the ACLS Guidelines 2015. The predetermined depth may be a universally acceptable depth, applicable to all patients, and programmed into the control system, or a depth determined by the control system prior to performing a compression.) The chest compression device of FIGS. 1 and 2 illustrate a compression means as a convenient basis for explaining the system and method of determining chest compression depth, and providing feedback for control, as described below. Other chest compression means, which may employ a compression belt, an inflatable vest, a motorized piston or other compression component operable to exert compressive force on the anterior chest wall of the patient, and moving relative to a fixed component such as a backboard, gurney or other structure fixed relative to the patient, or comparable means for chest compression, can be used in conjunction with this system and method, in which case one accelerometer assembly may be secured to the compression component and the other accelerometer assembly may be attached or fixed to the fixed component. This placement of the accelerometer assemblies disposes the first accelerometer assembly in fixed relationship to the patient's anterior chest wall, and disposes the second accelerometer assembly in fixed relationship the posterior surface of the patient's thorax.

A 3-axis accelerometer may comprise 3 distinct accelerometers assembled in a device, or, as in an Analog Devices ADXL335, may employ a single sensor such as a capacitive plate device, referred to as an accelerometer, to detect acceleration on multiple axes. In the case of a single device, the accelerometer assembly is operable to sense acceleration on three axes and provide acceleration signals corresponding to acceleration on the three axes, and operable to generate acceleration signals corresponding to acceleration on the three axes. Single or double axis accelerometer assemblies may also be used, and single or double-axis accelerometers (an Analog Devices ADXL321 two-axis accelerometer, or two ADXL103 single axis accelerometers, for example) may be combined into an accelerometer assembly to sense acceleration on three axes. Accelerometers of any structure, such as piezoelectric accelerometers, piezo-resistive accelerometers, capacitive plate accelerometers, or hot gas chamber accelerometers may be employed in the accelerometer assemblies used in the system. Other motion sensors may be used, and the solution presented here can be generalized to apply to single and double-axis accelerometers.

Figure 3:
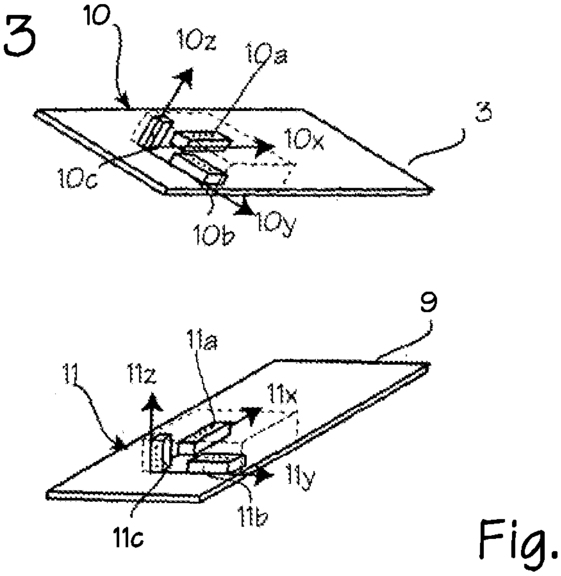
FIG. 3 shows the accelerometer assemblies in a non-parallel orientation relative to each other.

FIG. 3 illustrates the relationship between the accelerometer assemblies and their respective axes. Accelerometer assemblies 10 and 11 are characterized by orthogonal axes. In this example, each accelerometer assembly is a multi-axis accelerometer assembly, typically with three distinct accelerometers 10*a* 10*b* and 10*c* aligned along orthogonal axes 10*x*, 10*y* and 10*z*, respectively, and accelerometers 11*a*, 11*b*, and 11*c* with three distinct orthogonal axes 11*x*, 11*y*, and 11*z*. Each accelerometer is capable of detecting acceleration along its axis. By convention, the z axis corresponds to vertical or the anterior/posterior axis of the patient, and values above the x-y plane (anterior relative to the patient) are positive. The x and y axes may or may not correspond to anatomical axes of the patient. The first accelerometer assembly 10 is disposed in or on the compression belt, near the center of the load distributing band at a location that moves most closely with the patient's anterior chest wall.

Figure 4:
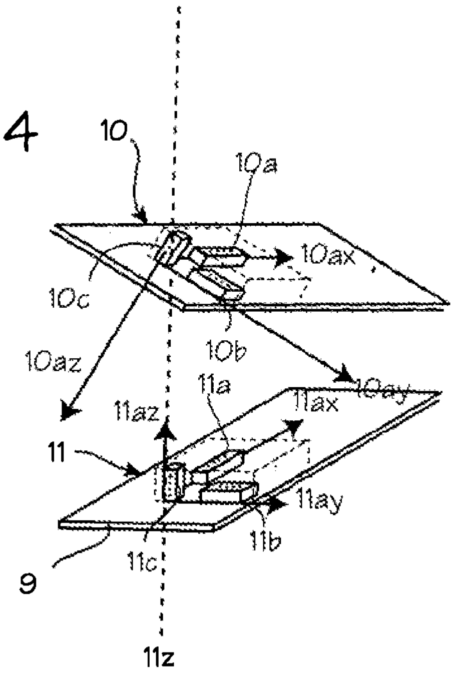
FIGS. 4 and 5 illustrates the movement of the accelerometer assemblies in a non-parallel orientation relative to each other.

Ideally, the accelerometer assemblies would both be lying on parallel planes, so that the acceleration signals from each assembly could be combined to obtain the net difference in acceleration between the accelerometers, and determine the net change in distance between the accelerometers. Often, however, the accelerometer assemblies are not disposed on parallel planes, (e.g., when used with a compression device which is moving, or where one accelerometer is positioned on a compression belt which is misaligned on a patient). This non-parallel relationship is depicted in FIG. 3, which shows the accelerometers in a non-parallel orientation relative to each other. Assuming the second accelerometer assembly (mounted on the housing) is level with the ground, and axis 11*z* is aligned with true vertical or the anterior/posterior axis of the patient and the device, if the first accelerometer assembly 10 (mounted on the belt) were to be pushed straight downward along the axis 11*z*, as shown in FIG. 4, its corresponding z-axis accelerometer 10*c* would sense an acceleration indicative of movement which is less than the total downward movement of the assembly along true vertical axis 11*z*. Thus, after subtraction of any vertical movement measured by the accelerometer assembly 11, the calculated downward chest compression would be smaller than it actually is, given that the entire accelerometer assembly was pushed straight down along axis 11*z* (in this example).

Figure 5:
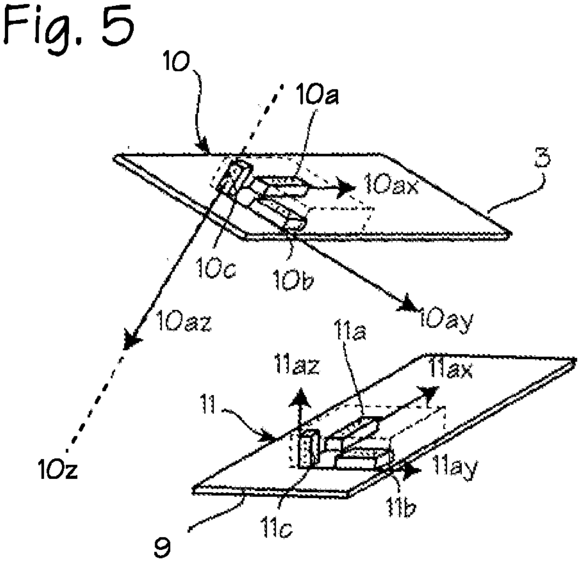

A similar error occurs if the accelerometer assembly moves downward along axis 10*z* (down and to the left, as in FIG. 5), while tilted as shown. Again, assuming the second accelerometer assembly (mounted on the housing) is level with the ground, and axis 11*z* is aligned with true vertical or the anterior/posterior axis of the patient and the device, if the first accelerometer assembly 10 (mounted on the belt) were to be pushed downward along the axis 10*z*, its corresponding z-axis accelerometer 10*c* would sense an acceleration indicative of movement greater than the total downward travel of the assembly along true vertical axis 11*z*. Thus, even after subtraction of any vertical movement measured by the accelerometer assembly 11, the calculated downward chest compression would be larger than it actually is, given that the entire accelerometer assembly was pushed straight down along axis 10*z* (in this example). Thus, the calculated downward chest compression might be larger or smaller than actual, depending on the relative orientations of the two accelerometer assemblies and the relative motion of the accelerometer assemblies.

Figure 6:
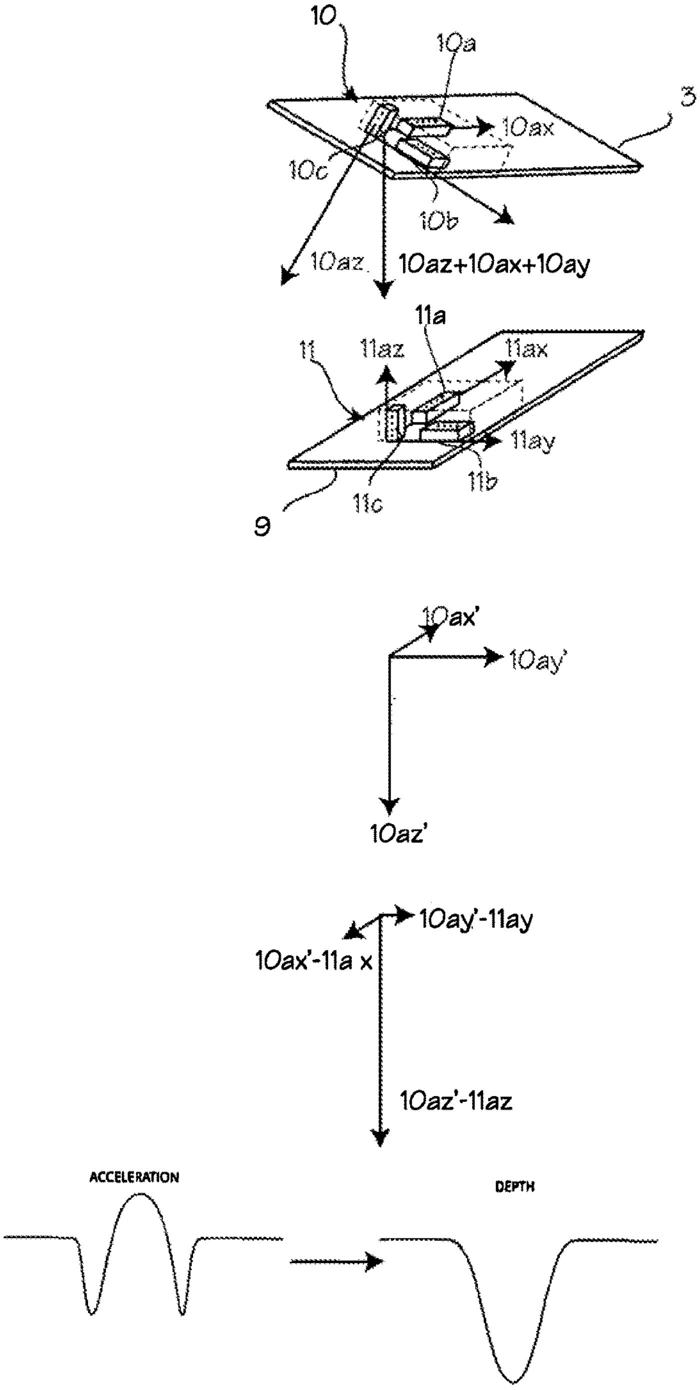
FIG. 6 illustrates rotation of acceleration vectors obtained from a first accelerometer assembly into the coordinates of a second accelerometer assembly and subsequent combination of the rotated acceleration vectors with the acceleration vectors of the second accelerometer assembly.

This issue can be corrected by rotating motion signals, such as the acceleration vectors obtained from accelerometer assembly 10, into the coordinates of accelerometer assembly 11, prior to combination of the acceleration signals from each accelerometer assembly. This may be accomplished with a rotation matrix, determined as discussed below, to rotate the acceleration signals sensed along axes 10*x*, 10*y* and 10*z* into rotated vectors 10*ax*', 10*ay*' and 10*az*' which match the coordinate system of the second accelerometer system. FIG. 6 illustrates the method in the situation where the accelerometer assembly on the compression belt is forced straight along axis 11*az*, while tilted. FIG. 6 illustrates rotation of acceleration vectors obtained from a first accelerometer assembly 10 into the coordinates of a second accelerometer assembly and subsequent combination of the rotated acceleration vectors with the acceleration vectors of the second accelerometer assembly 11. The acceleration vectors which are typical of movement due to CPR compressions are shown associated with the accelerometer assembly 10 (secured to the load distributing band 4), and are labeled 10*ax*, 10*ay* and 10*az*, with the resultant vector label as 10*ax*+10*ay*+10*az*. The largest acceleration is, as expected, along the z axis, which is ideally aligned with the anterior/posterior axis of the patient, but is often a bit askew, as shown. Assuming that the load distributing band, the accelerometer assembly, and the patient's anterior chest wall move in tandem, a downward movement of the accelerometer assembly will correspond to downward movement of the patient's anterior chest wall. However, a downward displacement which occurs while the accelerometer assembly 10 is tilted relative to the anterior/posterior axis (and, correspondingly, the z axis 11*z* of the second accelerometer assembly 11) results in acceleration vectors 10*ax*, 10*ay* and 10*az* which do not accurately reflect movement of the accelerometer assembly 10 relative to the accelerometer assembly 11. In this specific illustration, the sensed acceleration 10*az* will be small, compared to the downward movement of the accelerometer assembly 10 along axis 11*z* of the second accelerometer. While the accelerometer assembly 10 is sensing movement of the compression belt, the assembly 11 is sensing movement of the housing (which also corresponds to non-CPR movement of the anterior chest wall) and producing acceleration signals corresponding to acceleration vectors 11*ax*, 11*ay*, and 11*az* (Step 1). If the control system were to combine the sensed acceleration vectors (for example, 10*az* and 11*az*), the result would be a combined acceleration vector that is smaller than the actual net acceleration of the accelerometer assembly 10 along the vertical/a/p axis and axis 11*z*. To correct for this, the sensed acceleration vectors 10*ax*, 10*ay* and 10*az* are rotated (Step 2) into the reference frame of the second accelerometer assembly 11. (This may also be expressed as projecting the acceleration vectors 10*ax*, 10*ay* and 10*az* onto the coordinate system 11*x*, 11*y*, and 11*z* of the second accelerometer assembly 11.) This results in rotated vectors 10*ax*', 10*ay*' and 10*az*'. The rotated vectors are then combined with the sensed "reference" acceleration vectors 11*ax*, 11*ay*, and 11*az* to determine net acceleration vectors 10*ax*'-11*ax*, 10*ay*'-11*ay*, and 10*az*'-11*az* (Step 3). The net acceleration vectors are then processed to determine the net displacement of the first accelerometer (Step 4), which corresponds more closely to the net displacement of the patient's anterior chest wall caused by a CPR compression.

Rather than rotating all three axes of data obtained from the compression belt accelerometer assembly 10 after determining the rotation matrix, the control system can be programmed to use the rotation matrix to rotate only the Z axis acceleration vector 10*az* of the compression belt accelerometer assembly into the z axis 11*z* of the reference accelerometer assembly, then do the combination and further calculate displacement.

Where the rotation matrix or the relative orientation of the accelerometer assemblies is unknown, the control system can operate the accelerometer assemblies to determine the rotation matrix. When used in combination with an automatic chest compression device such as the AutoPulse® chest compression device, the rotation matrix that may be used to rotate the axis of the first accelerometer into the coordinates of the second accelerometer can be calculated when the first accelerometer assembly is presumptively "at rest" relative to the coordinate frame of the second accelerometer assembly in the housing. This may be before compressions start, between every compression during intercompression pauses of the device, during the high compression hold of the device, or between groups of compressions (during ventilation pauses). Preferably, it is accomplished between every compression, during the inter-compression hold, because the compression band may shift relative to the patient, and the attached accelerometer assembly may rotate relative to the reference sensor, during every compression cycle. To determine the rotation matrix, the control system receives the acceleration signals from both accelerometer assemblies during a quiescent period (one of the hold periods). At these quiescent periods, the control system operates on the assumption that both accelerometer assemblies are subject to zero acceleration other than gravity. In an immobile, non-moving patient, the acceleration signals will be solely due to gravity, which can subtracted from both signals or naturally canceled out when the signals are combined (in which case it can be ignored in the calculations). Because the second accelerometer assembly is fixed to the housing with its axis aligned to the housing, with the z-axis aligned with the anterior/posterior axis of the housing, the x-axis and y-axis aligned in a plane perpendicular to the z-axis, and we are concerned with movement of the first accelerometer assembly toward the housing, we can use the reference frame of the second accelerometer assembly, to determine the rotations matrix. The control system is programmed to compare the acceleration signals of the second accelerometer assembly with the acceleration signals of the first accelerometer assembly, determine the orientation of the accelerometer assemblies relative to each other, and from this, determine a rotation matrix which, when applied to one accelerometer assembly, will rotate the acceleration vectors from the one accelerometer assembly into the coordinate frame or orientation frame of the other. In reference to FIG. 4, the second accelerometer assembly is used as the reference frame, and the first accelerometer assembly is rotated into the reference frame of the second accelerometer assembly. The system may also operate by using the first accelerometer assembly as the reference.

Another mode of establishing the rotation matrix is based on detection of the gravitational acceleration. At these quiescent periods, the control system assumes that both accelerometer assemblies are subject to the same acceleration. In a moving patient, the acceleration signals will be due to gravity plus any ambient accelerations experienced by the accelerometer assemblies. The control system receives the acceleration signals from both accelerometer assemblies, including acceleration values each of the x, y and z axes. If the accelerometer assemblies are disposed on a parallel plane, these signals should be the same, though non-zero. Any difference in the acceleration signals is due to a difference in orientation relative to gravity (which is always the same direction and magnitude for both accelerometer assemblies). Thus, the control system can determine the orientation of the accelerometer assemblies relative to each other, and from this, determine a rotation matrix which, when applied to one accelerometer assembly, will rotate the acceleration vectors from the one accelerometer assembly into the coordinate frame of the other.

Determination of the quiescent period may be determined from the accelerometer assemblies themselves. The accelerometer assemblies and the control system operate continually to generate and receive acceleration signals. The control system may thus be programmed to interpret periods in which both accelerometer assemblies are generating acceleration signals indicative of acceleration in a predetermined small range, or below a certain threshold, as a quiescent period, and determine the rotation matrix, as described above, during quiescent periods as determined by this method. A chest compression device, such as the AutoPulse® chest compression device, operates to provide quiescent periods (such as an inter-compression pause or high compression hold), and manual CPR compressions are typically performed with a brief pause between compressions that are sufficiently quiescent to obtain a rotation matrix. Thus, the rotation matrix may be determined between compressions accomplished by a chest compression device and between compressions performed manually. Other methods of determining the quiescent periods may be used, including using input from the chest compression device itself as to when it is operating to provide a quiescent period, such that the control system operates to determine the rotation matrix during periods when the control system is holding the compression component to provide the quiescent period.

In determining the rotation matrix, instead of using two accelerometer assemblies to determine orientation of the two motion sensors in a quiescent period, the system may additionally comprise a combination of an accelerometer, gyroscope and magnetometer (sometimes referred to as an Inertial Measurement Unit, or IMU), and use the inertial measurement unit to determine the rotation matrix. The inertial measurement unit is operable to provide a secondary constant apart from gravity, for example a vector indicating the magnetic north (this vector will be common to both accelerometer assemblies). The control system can operate the accelerometer assemblies and inertial measurement units to determine the rotation matrix, using a second reference from each inertial measurement unit to resolve orientation without using a three orthogonal axis accelerometer embodiment.

The control system is operable to receive motion signals from the first motion sensor and the second motion sensor, and compensate for tilt between the orientations of the two motion sensors to determine the motion of the first motion sensor relative to the motion of the second motion sensor, and further operable to generate an output indicative of displacement of the first motion sensor. Where the motion sensors include accelerometers, the accelerometer output is processed by a control system, which is operable to receive the acceleration signals and calculate the distance that each accelerometer assembly has moved during each compression. The control system subtracts the acceleration detected by the second accelerometer assembly from the acceleration detected by the first accelerometer assembly and then calculates displacement motion of the first sensor, which correspond to chest wall displacement induced by CPR. The control system also operates to generate a signal indicative of the calculated displacement for output to a chest compression device for control of the compressions performed by the chest compression device, or for output to an output device which generates feedback (visual, audible or haptic output) to a CPR provider to indicate the depth of compressions achieved.

The control system which performs the calculations to determine depth of compression and the control system which controls operation of the chest compression device may be provided as separate sub-systems, with one subsystem controlling the chest compression device operable to receive input from another sub-system operable to receive sensor input and determine chest compression depth and provide feedback to the first sub-system to control the chest compression device, or the control systems may be provided in a single control system operable to perform the depth determinations based on compression sensor data and operable to control the chest compression device. The control system may also be operable to perform the depth determinations based on compression sensor data and operable to control a feedback device to provide perceptible feedback to a rescuer providing CPR. The control system comprises at least one processor and at least one memory including program code with the memory and computer program code configured with the processor to cause the system to perform the functions described throughout this specification. The control system may be programmed upon manufacture, and existing compression devices may updated through distribution of software program in a non-transitory computer readable medium storing the program, which, when executed by a computer or the control system, makes the computer and/or the control system communicate with and/or control the various components of the system to accomplish the methods, or any steps of the methods, or any combination of the various methods, described above.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A system for monitoring chest compression depth in a patient during cardio-pulmonary resuscitation delivery, the system comprising:

a first sensor operable to generate first signals indicative of first sensor motion, wherein the first sensor motion corresponds to a first coordinate frame;

a second sensor operable to generate second signals indicative of second sensor motion, wherein the second sensor motion corresponds to a second coordinate frame; and at least one processor configured to obtain, from the first sensor, the first signals, obtain, from the second sensor, the second signals, identify, based on the first signals and the second signals, a relative orientation between the first sensor and the second sensor, determine, using the relative orientation, a rotation matrix configured to rotate the first coordinate frame of the first sensor into the second coordinate frame of the second sensor, and provide the rotation matrix for use in calculating a depth measurement of chest compression depth.

2. The system of claim 1, wherein at least one of the first sensor or the second sensor comprises an inertial measurement unit (IMU).

3. The system of claim 2, wherein determining the rotation matrix comprises applying a secondary constant in addition to a gravitational constant, wherein the IMU determines the secondary constant.

4. The system of claim 1, wherein at least one of the first sensor or the second sensor is disposed on or in a fixed component of the system, and the other of the first sensor or the second sensor is disposed on or in a compression component of the system.

5. The system of claim 4, wherein the fixed component is a backboard or a gurney.

6. The system of claim 1, wherein providing the rotation matrix comprises providing the rotation matrix to a control system.

7. The system of claim 6, further comprising the control system, wherein the control system is configured to:

calculate the depth measurement; and compare the depth measurement to a predetermined depth.

8. The system of claim 7, wherein a single device comprises the at least one processor and the control system.

9. The system of claim 1, wherein:

the at least one processor is configured to identify a quiescent period during which compression motion is paused; and the rotation matrix is determined during the quiescent period.

10. The system of claim 9, wherein the quiescent period is identified by analyzing the first signals and the second signals.

11. The system of claim 9, wherein a control system provides an input indicative of the quiescent period.

12. The system of claim 1, further comprising an output device configured to provide feedback perceptible to a rescuer performing compressions.

13. The system of claim 12, wherein the feedback comprises one or more of audible feedback, visual feedback, or haptic feedback.

14. The system of claim 1, wherein at least one of the first sensor and the second sensor is adapted to be affixed to the body of the patient.

15. A method for determining depth of chest compressions during cardio-pulmonary resuscitation, the method comprising:

providing a monitoring apparatus comprising a reference assembly comprising at least one reference sensor configured to generate reference signals indicative of motion in a reference coordinate frame, and at least one motion assembly, the at least one motion assembly comprising at least one sensor configured to generate motion signals indicative of motion in another coordinate frame;

obtaining, from the reference assembly, the reference signals;

obtaining, from a first assembly of the at least one motion assembly, first motion signals;

identifying, by at least one processor based on the reference signals and the first motion signals, a relative orientation between the reference assembly and the first assembly; and determining a rotation matrix configured to align a first coordinate frame of the first assembly with the reference coordinate frame of the reference assembly;

wherein the rotation matrix is used by the at least one processor or a separate control system to determine a displacement corresponding to compression depth.

16. The method of claim 15, wherein providing the monitoring apparatus comprises providing an automated compression means comprising the monitoring apparatus.

17. The method of claim 15, further comprising positioning a patient relative to the monitoring apparatus such that the reference assembly is positioned in a fixed relationship to the posterior surface of the thorax of the patient.

18. The method of claim 15, further comprising positioning a patient relative to the monitoring apparatus such that the first assembly is positioned in a fixed relationship to the anterior chest wall of the patient.

19. The method of claim 15, further comprising determining the displacement by rotating a z-axis acceleration vector corresponding to the first assembly into a z-axis reference of the reference assembly.

20. The method of claim 15, wherein the at least one reference sensor is a different type of sensor than the at least one sensor of the first assembly.

* * * * *